(12) United States Patent
Mori

(10) Patent No.: US 6,338,048 B1
(45) Date of Patent: Jan. 8, 2002

(54) ELECTRONIC TRANSACTION SYSTEM

(75) Inventor: Toru Mori, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 09/254,706

(22) PCT Filed: Sep. 12, 1997

(86) PCT No.: PCT/JP97/03234

§ 371 Date: Mar. 12, 1999

§ 102(e) Date: Mar. 12, 1999

(87) PCT Pub. No.: WO98/11514

PCT Pub. Date: Mar. 19, 1998

(30) Foreign Application Priority Data

Sep. 13, 1996 (JP) .............................................. 8-243103

(51) Int. Cl.⁷ ................................................ G06K 5/00
(52) U.S. Cl. ....................................................... 705/41
(58) Field of Search ............................. 705/41; 235/380

(56) References Cited

U.S. PATENT DOCUMENTS

| | | | | |
|---|---|---|---|---|
| 4,906,828 A | * | 3/1990 | Halpern ...................... | 235/379 |
| 4,960,981 A | * | 10/1990 | Benton et al. ................. | 705/41 |
| 5,140,517 A | * | 8/1992 | Nagata et al. ................. | 705/41 |
| 5,144,115 A | * | 9/1992 | Yoshida ........................ | 705/41 |
| 5,461,217 A | * | 10/1995 | Claus .......................... | 235/380 |

FOREIGN PATENT DOCUMENTS

| | | |
|---|---|---|
| EP | 0 348 923 | 1/1990 |
| EP | 0793206 A | * 9/1997 |
| JP | 2-35568 | 6/1990 |
| JP | 3-116469 | 3/1991 |
| JP | 3-98194 | 4/1991 |
| JP | 4-149723 | 5/1992 |
| JP | 7-85172 | 3/1995 |

OTHER PUBLICATIONS

"Burger King Smart Cards Cooking with Customers"–Supermarket News V48 n25 p. 19.*

* cited by examiner

Primary Examiner—Vincent Millin
Assistant Examiner—Geoffrey Akers
(74) Attorney, Agent, or Firm—Venable; Robert J. Frank; Jeffrey W. Gluck

(57) ABSTRACT

A plurality of types of settlement conditions exist for transactions with electronic money. An electronic transaction system capable of being applied to a plurality of types of settlement conditions using a single automatic teller machine is provided. In order to achieve this, this system has the following configuration. Namely, in this electronic transaction system for carrying out transaction settlements using electronic money stored on a customer card while using an automatic teller machine, customer identification information and an electronic money amount are stored as balance information for each customer account established at a financial institution, with the customer card being such that stored information can be updated based on pre-decided transaction conditions. The automatic teller machine then houses customer cards corresponding to a plurality of transaction conditions and a plurality of ATM cards, and a plurality of control software is prepared. Control software coinciding with the transaction conditions is then activated, and transactions are carried out with the ATM cards stored in the automatic teller machine.

17 Claims, 14 Drawing Sheets

ELECTRONIC TRANSACTION SYSTEM

TECHNICAL FIELD

The present invention relates to an electronic transaction system for depositing currency to a financial institution such as a bank, storing a value corresponding to this currency as money information (electronic money) in a card (IC card) mounted with an integrated circuit and settling the cost by withdrawing from electronic money stored on the IC card when paying at the time of a business transaction such as the purchase of goods.

BACKGROUND ART

A number of methods of settling costs using electronic money exist, such as prepaid (advance payment), debit (immediate payment) and credit (deferred payment). An example of a method for settling costs by prepayment is disclosed in Japanese Patent Publication No. Hei. 7-104891. In this publication, technology is disclosed where an outstanding amount is deducted from a balance recorded on a customer IC card (hereinafter referred to as "customer card") and the outstanding amount is directly transferred to a vendor IC card (hereinafter referred to as "vendor card").

This technology is characterized by the point that charge settlement is then complete in the case of a business transaction. This technology means that the former case where a vendor would have to take transaction records to a financial institution to have the transaction records put into cash form is no longer the case. This technology has reduced the cash handling costs involved in the calculating of cash and change at vendors and financial institutions and eliminated the accompanying office processing.

However, a number of conditions exist in charge settlement methods employing electronic money due to differences in the aforementioned methods and differences in the approaches of each financial institution that are issuing bodies for electronic money even when the method is the same. Within this number of conditions there are several methods of replenishing customer cards with electronic money. In these methods, the customer has to replenish the customer cards with electronic money coinciding with the charge settlement conditions set at each customer card. Because of this, the customer has to go to a branch of a financial institution handling electronic money that coincides with the charge settlement conditions for each customer card and replenish the customer card with electronic money, or alternatively, replenish the customer card with electronic money at the customer's house using a household terminal coinciding with the charge settlement conditions.

When a customer card is replenished with electronic money at a branch of a financial institution, the customer utilizes an automatic teller machine capable of performing electronic money replenishment transactions, cash is put into the automatic teller machine so that the cash is converted to electronic money, and this then replenishes a customer card. Alternatively, a connection can be made using the automatic teller machine with the host computer of the financial institution managing the customer's account, and the customer can replenish the customer card with electronic money from his own account to a value corresponding to a prescribed amount. However, at this time it is necessary for the customer to look for a branch of the financial institution that issued the card or go a long distance to a branch. This makes replenishing the customer card with electronic money laborious.

When the customer replenishes the customer card with electronic money at his own home, the customer connects with the host computer of the financial institution managing his personal account via a communications line, etc., using a household terminal capable of performing electronic money replenishing transactions and replenishes the customer card inserted into the household terminal with a value corresponding to a prescribed amount to be withdrawn from the customer's own account in the form of electronic money. It is therefore necessary at this time for the customer to prepare a number of household terminals for each of the cost settlement conditions, which requires substantial installation investment. Alternatively, it is necessary to prepare a customer card issued by the issuing body that coincides with the charge settlement conditions set at the household terminal. Either approach is extremely troublesome for the customer. Because of these reasons, customers have not been able to utilize the electronic transaction systems in a sufficient manner, and financial institutions have not been able to effectively utilize automatic teller machines that have been maintained with substantial investment in installations.

DISCLOSURE OF INVENTION

The present invention adopts the following configurations in order to resolve the aforementioned problems.

(Configuration 1)

In a first aspect of the present invention, in an electronic transaction system utilizing a customer card issued so as to correspond to a customer account established at a financial institution, for carrying out transaction processing of pre-decided settlement conditions and an automatic teller machine, where transaction processing is carried out using the customer card and electronic money, a plurality of ATM cards for carrying out transaction processing of pre-decided transaction conditions for electronic money of different issuers or for different types of electronic money of the same issuer are housed at an automatic teller machine, control software for controlling the plurality of ATM cards is stored and a plurality of transaction processes of different settlement types can be obtained.

(Description of Configuration 1)

This system is capable of carrying out transaction processing using electronic money of different issuing bodies or different types of electronic money of the same issuer.

(Configuration 2)

In a second aspect of the present invention, the automatic teller machine of the first aspect of the present invention reads information specifying settlement conditions from an inserted customer card, activates control software coinciding with the settlement conditions using the read information and carries out transactions between the ATM card stored in the automatic teller machine and the customer card.

(Description of Configuration 2)

This system reads information specifying the settlement conditions from the customer card and specifies the settlement conditions based on this information.

(Configuration 3)

In a third aspect of the present invention, the automatic teller machine of the first aspect of the present invention activates control software in a pre-decided settlement condition order when information specifying the settlement conditions is read from the inserted customer card and settlement conditions cannot be specified from the read information.

(Description of Configuration 3)

This system tests transaction processes in order using pre-decided settlement conditions when information specifying settlement conditions cannot be read from the customer card.

BEST MODE FOR CARRYING OUT THE INVENTION

The object of the present invention is to provide an electronic transaction system capable of executing transaction processes of different settlement conditions using a single terminal. In the present invention, a plurality of IC cards for use on the financial institution side corresponding to pre-decided settlement conditions are provided at each terminal.

Specific Example 1

The following is a description using a specific example of an embodiment of the present invention.
(Configuration of Automatic Teller Machine)

Figure 1:
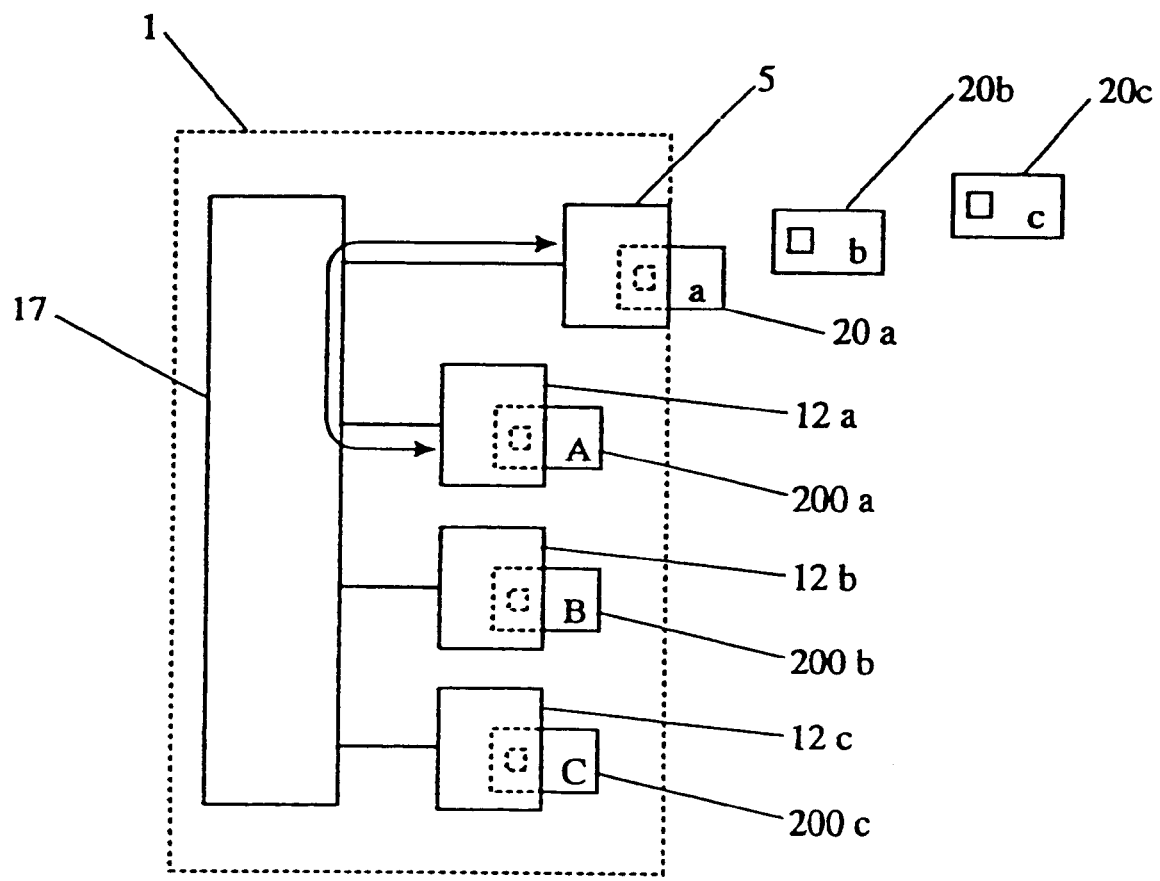
FIG. 1 is a view illustrating the concept of a transaction of the present invention.
Figure 2:
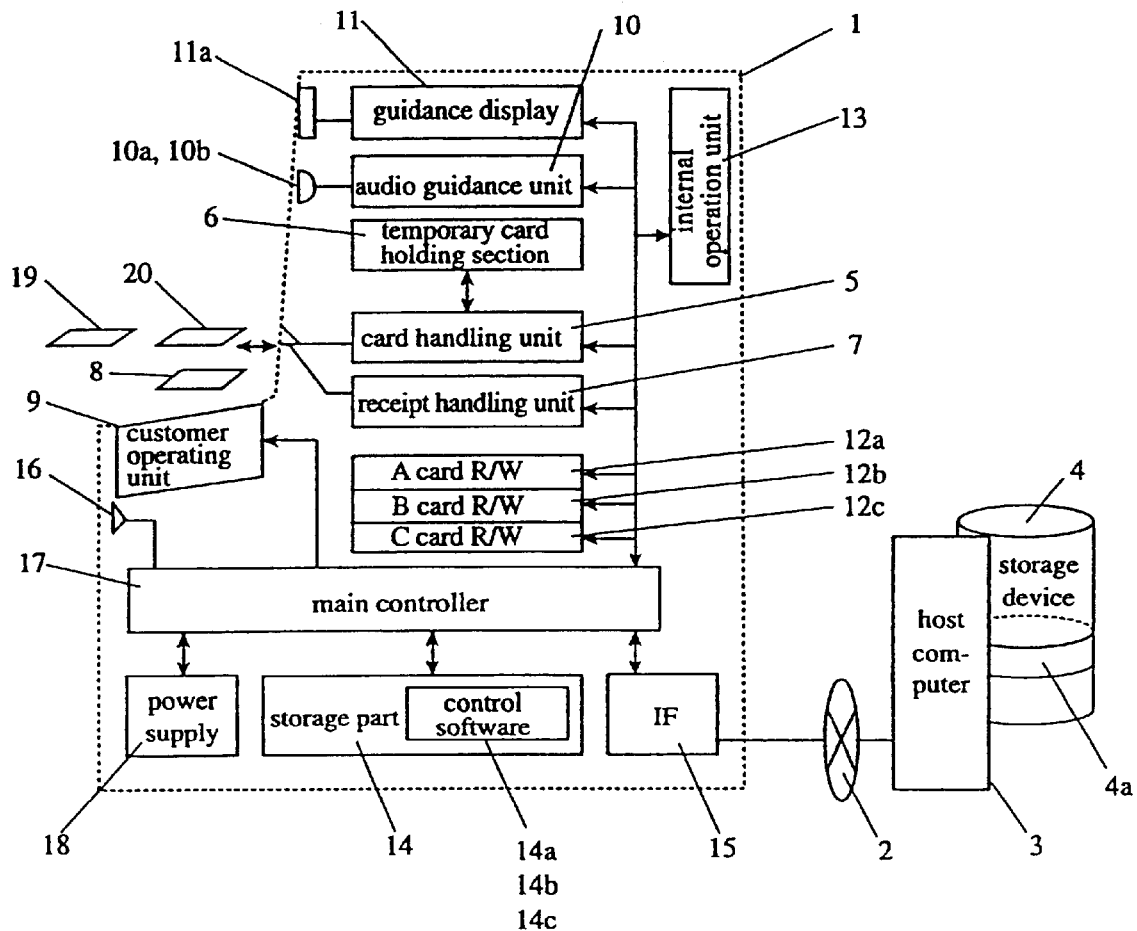
FIG. 2 is a block view of control of the automatic transaction device of the present invention.
Figure 3:
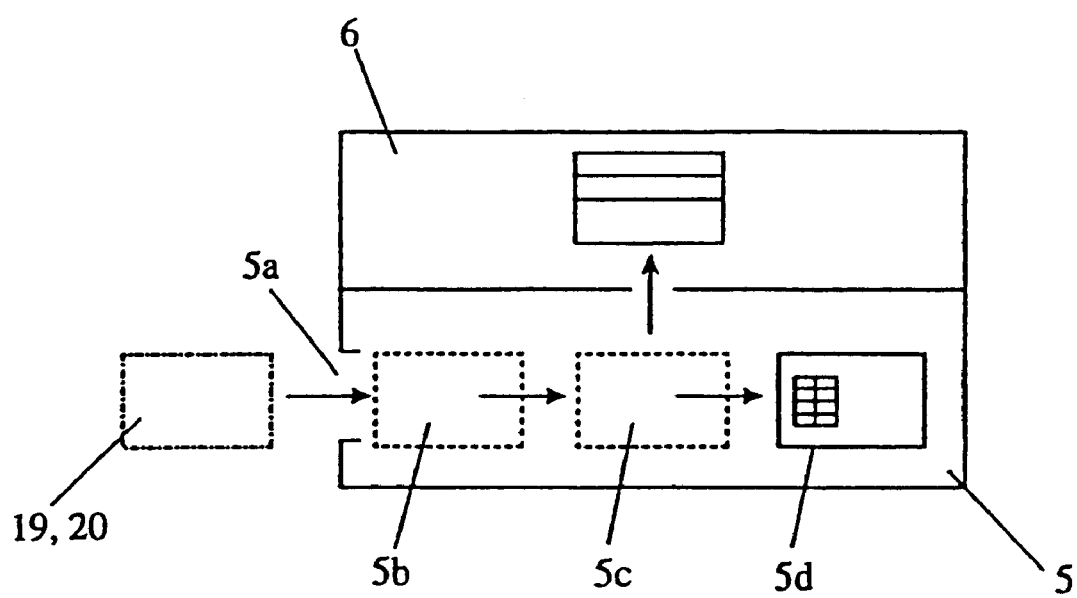
FIG. 3 is a view illustrating the outline of a card processor of the present invention.

FIG. 1 is a view illustrating the concept of a transaction of the present invention, FIG. 2 is a block diagram of control of an ATM used in the electronic transaction system of the present invention, and FIG. 3 is a view illustrating an outline of a guard processor of the present invention. This specific example shows a transaction system capable of executing transaction processing with three types of different settlement conditions using just one terminal.

In FIG. 1, numeral 1 represents an automatic teller machine (hereinafter referred to as "ATM") installed in a branch of a financial institution, a supermarket, convenience store or gasoline stand etc. Numeral 2 represents a communication line. Numeral 3 represents a host computer constituting an upper order device for the ATM 1 connected to the ATM 1 via the communication line 2.

Numeral 4 represents a storage device connected to and managed by the host computer 3. Numeral 4a represents a customer account file 4a stored in the storage device 4. The customer account file 4a stores the address, name, age, occupation, account number, pin number and balance information etc. for the account holder. The customer account file 4a is updated with the newest information when updating of the deposit balance information is designated by the host computer 3 every time a deposit or withdrawal transaction is carried out.

Numeral 5 represents a card handling unit for reading information stored on a card for customer use (hereinafter referred to as a customer card) and writing information. Numeral 5a represents a card insertion/return opening 5a. The card insertion/return opening 5a is provided at the front of the ATM 1 and is connected by a conveyance path with the card handling unit 5 provided within the ATM 1. When a customer card is inserted by a customer via the card insertion/return opening 5a, the customer card is conveyed to the card handling unit 5 by the conveyance path wherein, prescribed transaction processing is executed. The customer card is then conveyed to the card insertion/return opening 5a from the card handling unit 5 by the conveyance path and dispatched to outside of the ATM 1 from the card insertion/return opening 5a so as to be returned to the customer. Numeral 5b represents a magnetic reader. Numeral 5c represents an embossed character reader 5c for reading information recorded in a display area (to be described later) of the customer card. Numeral 5d represents an IC card reader electrically connected with the IC (Integrated Circuit) of the customer card, for reading information stored in the IC and writing information.

Numeral 6 is a temporary card holding section for temporarily holding cards inserted within the ATM 1 from the card insertion/return opening 5a and is provided in a sideways direction of the embossed card reader 5c so as to be conveyed so as to diverge from a conveyance path linking the card insertion/return opening 5a and the IC card reader/writer 5d by a conveyance means (5a). The customer card is conveyed to the temporary card holding section 6 from a conveyance path linking the card insertion/return opening 5a and the IC card reader 5d by a conveyance means (not shown). The conveyance means is constructed from a plurality of pairs of conveyance rollers and driver motors etc. constructed so as to be capable of rotating while sandwiching the customer card. This conveyance means and various sensors for conveyance control provided at the periphery of the conveyance means bear no direct relationship to the present invention and are therefore omitted from the drawings.

Numeral 7 represents a receipt handling unit. The receipt handling unit 7 prints transaction details on receipts 8 issued to the customer for every transaction and performs issuance processing. The conveyance path for conveying the receipt 8 is provided so as to merge in the vicinity of the conveyance path for conveying the customer card and the card insertion/return opening 5a. These conveyance paths are provided with card sensing means (not shown) in the vicinity of the card insertion/return opening 5a. The card sensing means senses the insertion of a customer card as well as sensing returned customer cards and discharge of issued receipts.

Numeral 9 represents a customer interface. The customer operating unit 9 comprises, for example, a touch panel. The customer operating unit 9 displays screens such as "IC card transaction guidance" or "withdrawals" which constitute one type of withdrawal processing and guides the customer to select the type of processing. If, at this time, the customer lightly touches (presses), for example, the part of the display for "withdrawals", the ATM 1 executes a transaction to replenish the customer card with electronic money.

Numeral 10 represents an audio guidance unit provided on the front of the ATM 1 for giving operation guidance using speech. The audio guidance unit 10 comprises a speaker 10a and a microphone 10b.

Numeral 11 represents a guidance display and numeral 11a represents a display provided at the front of the ATM 1. The guidance display 11 is for displaying possible transactions and operation guidance or can display information such as information peculiar to the local area when in a wait state at the display 11a.

Numerals 12a, 12b and 12c represent first, second and third card readers provided within the ATM 1. IC cards for financial institution use (hereinafter referred to as "ATM cards") 200a, 200b and 200c to be described later are installed at the card reader/writers 12a, 12b and 12c, respectively. One of these card reader/writers is selected and driven for every transaction process in response to the type of customer card inserted via the card insertion/return opening 5a or the transaction settlement conditions. The driven card reader/writer is itself electrically connected to an ATM card, with information being exchanged based on prescribed control software.

Numeral 13 is an internal operation part. The internal operation part 13 is constructed from, for example, a touch panel. The internal operation part 13 displays screens such as, for example, "procedure for installing ATM card to the card reader/writer". The clerk then installs ATM cards 200a, 200b and 200c at the card reader/writers 12a, 12b and 12c based on this display. Further, the internal operation part 13 is inputted with a code for releasing a prescribed door for the clerk and information for setting up the ATM cards, etc.

Numeral 14 represents a storage part provided within the ATM 1 consisting of ROM (Read Only Memory) and RAM (Random Access Memory) or a floppy disc etc. The storage part 14 has storage areas 14a, 14b and 14c. Programs for carrying out various control and control software for driving the first to third card readers 12a, 12b and 12c are stored in these storage areas.

Numeral 15 represents an interface (hereinafter referred to as a"I/F") for connecting the ATM 1 with the host computer 3.

Numeral 16 represents a proximity detector located at the front of the ATM 1 for detecting when a customer approaches the ATM 1. When a customer approaches the ATM 1, this is detected by the proximity detector 16, and a transition is made from a wait state to a transaction possible state. When the customer finishes the transaction and moves away from the ATM 1, this is also detected by the approach detector 16, and the higher order device is notified.

Numeral 17 represents a main controller for controlling each of the above parts. Numeral 18 represents a power supply for supplying electrical power to each of the above parts.

(Configuration of Customer Card)

Next, the customer card is described. Magnetic cards 19 that do not possess IC (Integrated Circuit) chips and electronic money cards (hereinafter referred to as IC cards) having IC chips exist as customer money cards. In the following, these are described separately from each other. However, as the theme of the present invention is charge settlement using electronic money, a description of the configuration of magnetic cards 19, that bear little relation to charge settlement using electronic money, is omitted.

Figure 4:
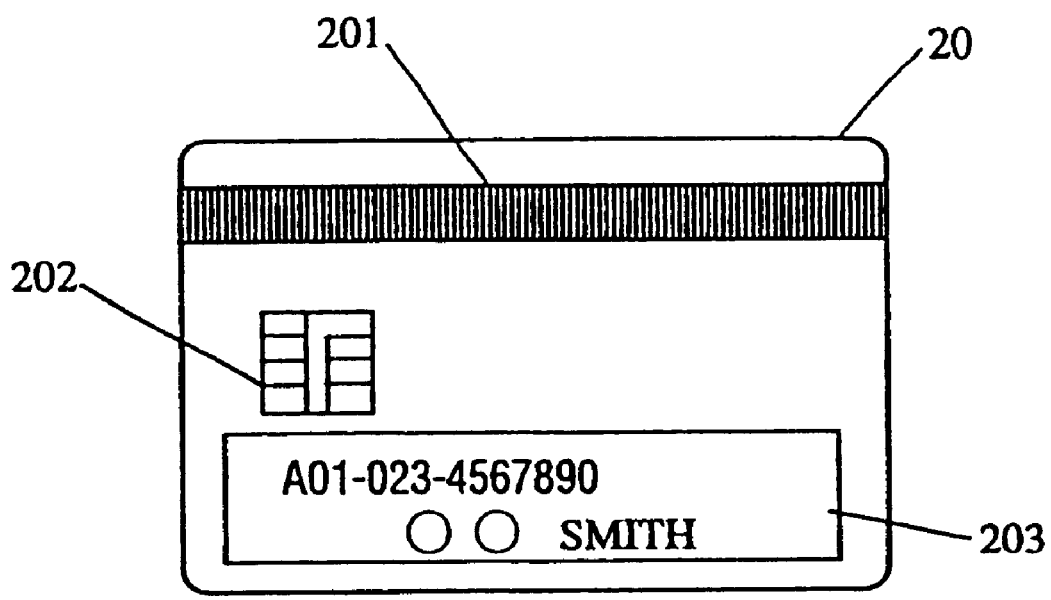
FIG. 4 is a view illustrating the IC card of the present invention.

FIG. 4 is a view illustrating an IC card.

In FIG. 4, numeral 20 represents an IC card. The size, physical characteristics, electrical characteristics and communications protocol of the IC card 20 all conform to international standards.

Numeral 201 represents a magnetic stripe. This magnetic stripe 201 is magnetically recorded with data peculiar to a particular customer such as a financial institution code, customer name, and account number etc. as well as a code that indicates that this IC card 20 has an IC (integrated circuit).

Numeral 202 is an IC (integrated circuit) chip. This IC chip 202 is embedded at a predetermined position of the card material, with electrical signals being exchanged with the IC card reader 5a via terminals exposed at the surface of the card.

The IC chip 202 has a ROM (Read Only Memory) written with a management program for carrying out transaction settlements, a RAM (Random Access Memory) for temporarily storing transaction contents and an EEPROM (Electrically Erasable and Programmable ROM) constituting a non-volatile memory for electrically erasing and re-writing storage information. The IC chip 202 also has a storage circuit for storing various kinds of data (for example, encryption software and encryption key information, and financial institution codes and data peculiar to a particular customer, etc.) and a control circuit (MPU) for controlling reading and writing to each of the memories.

Numeral 203 represents a display area. The display area 203 is printed with a code of a financial institution, a customer name and account number etc. and is embossed with embossed characters. In FIG. 4 is "A01" taken as an issuing body number, "023" taken as a identifying number, "4567890" taken as an ID number and the customer name is taken as "OO smith".

Next, a description is given of an example of data stored when the data stored in the IC card 20 is used in electronic transactions. In this embodiment, three types of settlement conditions are taken as type A, B and C with a description being given where the types A, B and C are assumed to be, for example, debit (immediate payment), credit (deferred payment) and prepaid (advance payment). IC cards 20 corresponding to the types A, B and C are then described as 20a, 20b and 20c, respectively are taken as type A, B and C, respectively, and classified for IC card 20a, 20b, and 20b respectively. The IC card 20 is stated as a typical example, when describing matters common to the IC cards 20a, 20b and 20c.

Figure 5:
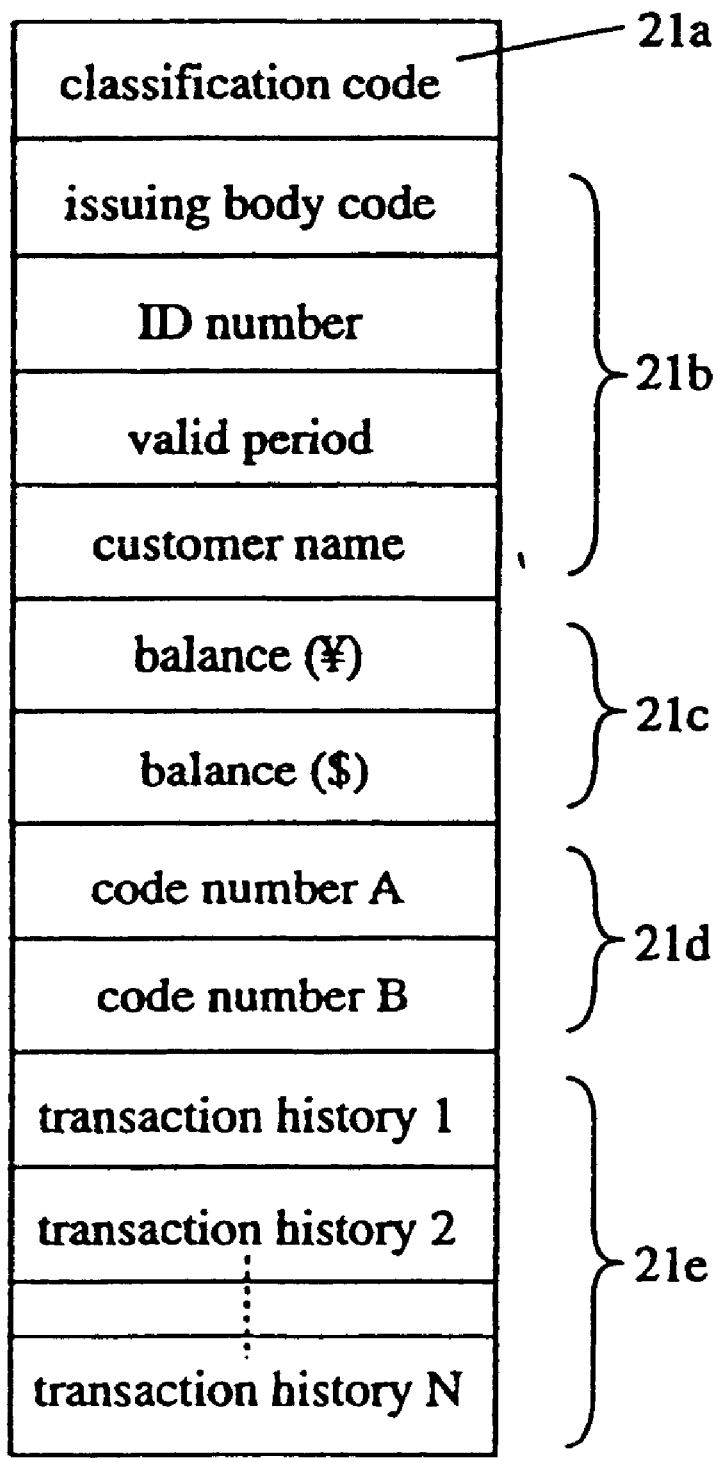
FIG. 5 is a conceptual view of the storage data of the IC card A of the present invention.

FIG. 5 is a conceptual view of data stored in the IC card 20a.

In FIG. 5, numeral 21a is a classification code showing that type A is taken as the settlement condition.

Numeral 21b represents data for the issuing body code, ID number, valid period, and customer name. Data stored at 21a and 21b is partially the same as information stored at the magnetic stripe 201.

Numeral 21c represents the electronic money balance held within the card. The balance 21c is recorded for each currency unit such as "yen" and "dollar" as shown in FIG. 5. This balance 21c is updated so as to be reduced when payment is carried out in a goods purchase transaction.

Numeral 21d is a code number for identifying the customer. In this specific example, two kinds (code number A and code number B) of code number 21d are set. These code numbers can be arbitrarily set in response to the application. For example, code number A can be set to be used by the customer themselves and code number B can be set to be used by a member of the customers family, etc. Alternatively, code number A can be set to be used for replenishment transactions and code number B can be set to be used for withdrawal transactions.

Numeral 21e represents a transaction history of first to Nth transactions. The transaction history 21e is data showing date and time, product name and amount etc. when carrying out transactions for purchasing goods.

Of the above data, at least the balance amount 21c and the transaction history 21e are stored in EEPROM capable of being updated. Reading and writing of this data to and from the EEPROM is controlled by the aforementioned control circuitry.

When two years have passed since issue of the IC card 20 or when the IC card 20 does not have a transaction history, in order to keep the electronic transaction system secure, the configuration is such that funds (electronic money held in the IC card 20 are temporarily frozen by the aforementioned control circuitry.

Figure 6:
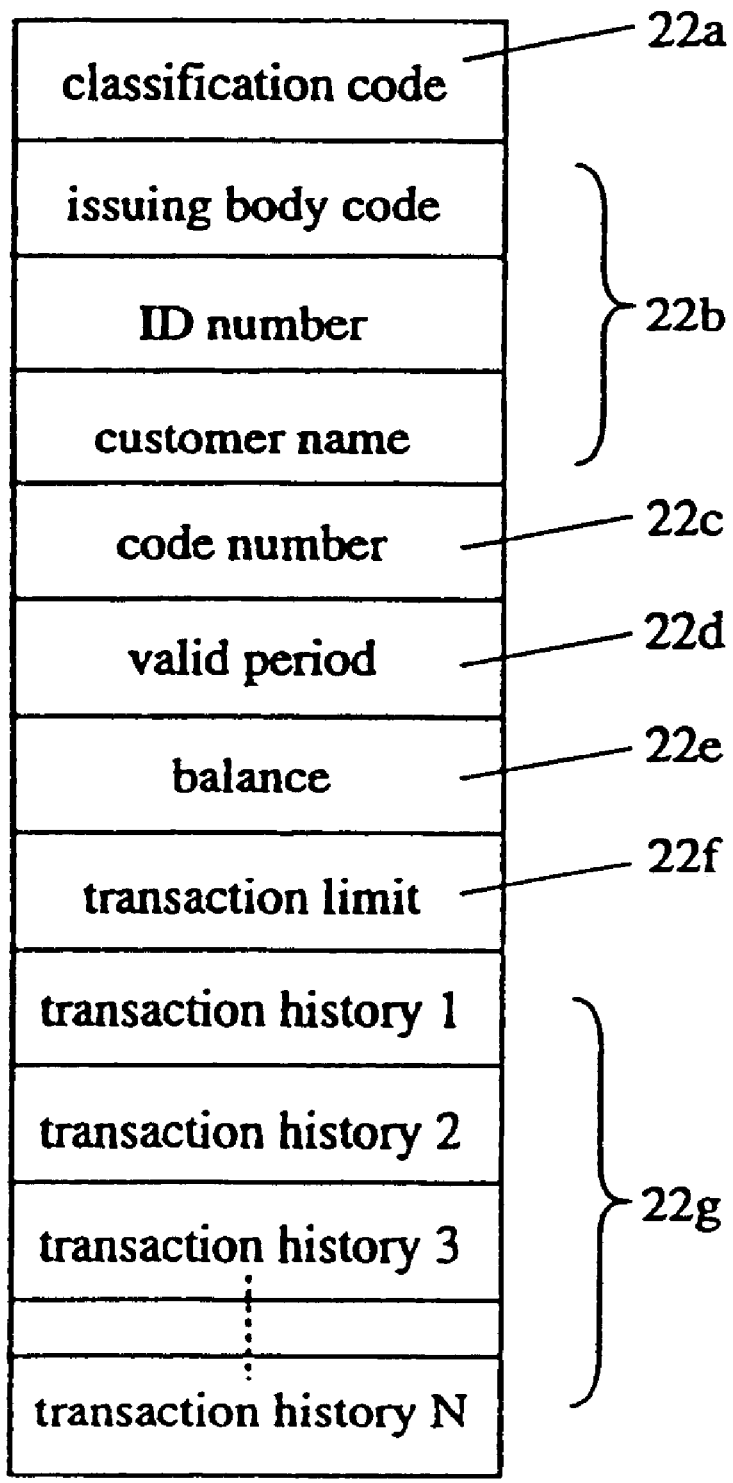
FIG. 6 is a conceptual view of the storage data of the IC card B of the present invention.

FIG. 6 is a conceptual view of data stored in the IC card 20b. This IC card 20b is for executing transaction processing of settlement conditions different from the settlement conditions of the IC card 20a. These different settlement conditions occur due to differences in methods or, even when the method is the same, from different approaches of each financial institution (banks, credit companies, and intermediaries etc.) that issues electronic money.

In FIG. 6, numeral 22a represents an identification code showing, that type B is taken as the settlement condition.

Numeral 22b is data for the issuing body code, ID number and customer name.

Numeral 22c represents a code number for identifying the customer.

Numeral 22d represents valid period data. When the valid period data 22d of the IC card 20 exceeds the valid period, the construction is such that funds (electronic money) held within the IC card 20 are temporarily frozen by the aforementioned control circuitry in order to keep the electronic transaction system secure. This is to take into consideration the chance that the storage data within the IC chip 202 may be updated due to changes in the system etc.

Numeral 22e represents a credit limit balance applied to the customer by the financial institution. When a payment operation is executed due to a goods purchase transaction, the balance 22e is reduced so as to be updated. With these purchase transactions, portions that are used are collected together and withdrawn from an account established at a financial institution etc. via a settlement network line.

Numeral 22f represents transaction limit data indicating the limit to which transactions are possible in the case of mainly credit (deferred payment) transactions.

Numeral 22g represents a transaction history for first to Nth transactions. The transaction history 22g is data showing the day and time, goods name and amount etc. when a product purchase transaction is carried out.

Of the above data, at least the balance 22e and the transaction history 22g are stored in an EEPROM.

Figure 7:
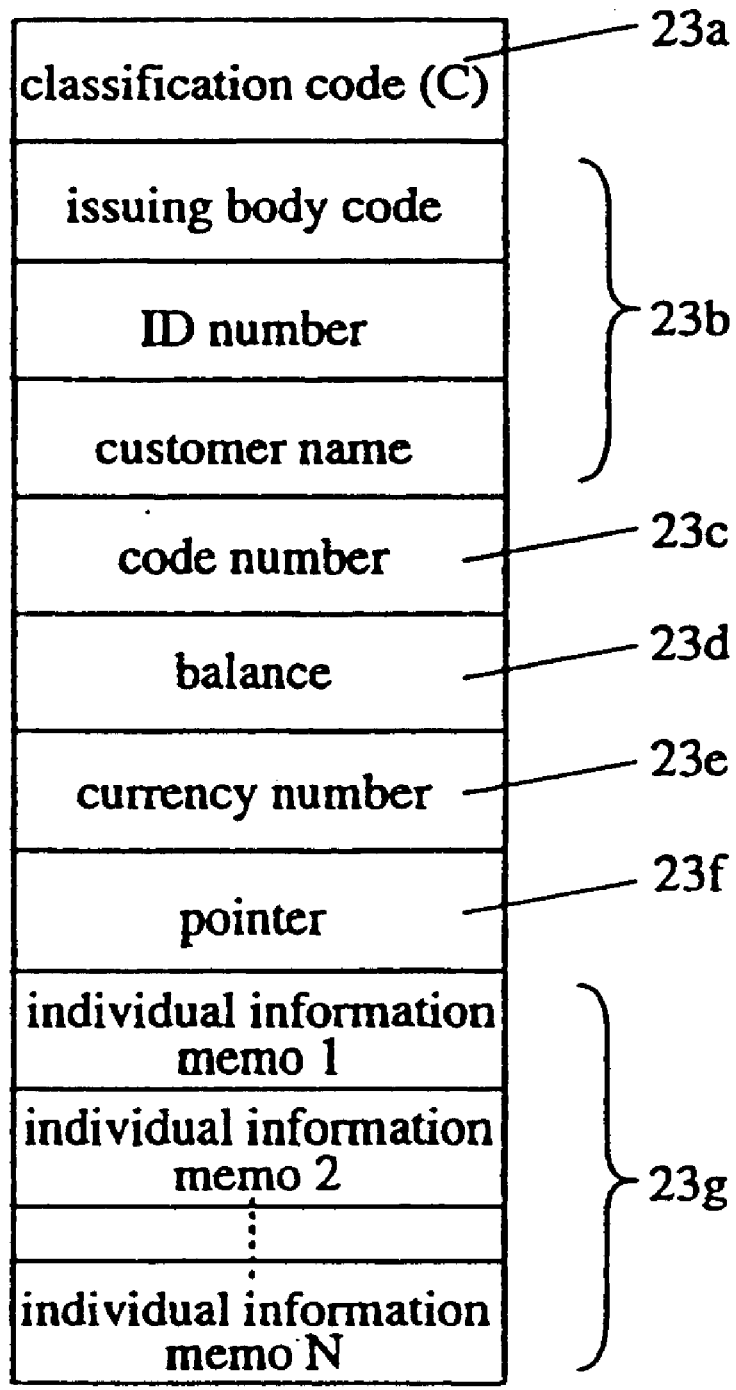
FIG. 7 is a conceptual view of the storage data of the IC card C of the present invention.

FIG. 7 is a conceptual view of the data stored in the IC card 20c. This IC card 20c is for executing transaction processing for settlement conditions different from the settlement conditions of the IC cards 20a and 20b.

In FIG. 7, numeral 23a represents an identification code indicating that type C is taken as the settlement condition.

Numeral 23b represents data for the issuing body code, ID number, customer name and valid period (not shown) etc.

Numeral 23c represents a code number for identifying the customer.

Numeral 23d represents the electronic money balance stored within the card. This balance 23d is reduced so as to be updated when a payment operation due to a goods purchase transaction is carried out. With this purchase transaction, a prescribed amount is transferred beforehand from an account established at a financial institution etc. via the settlement network line so that cash is converted to electronic money.

Numeral 23e represents a currency number. The balance is assumed to be stored as a currency type, with the currency number 23 then indicating a currency number for each type of money. For example, when it is assumed that one hundred thousand yen of electronic money is stored as eight ten thousand yen notes, two five thousand yen notes and ten one thousand yen notes, an alphanumeric number of approximately ten digits is added to each money type data as a currency number. When a payment of two one thousand yen notes (number XX, number XΔ) is made at the time of a transaction for purchasing goods of 1700 yen, currency numbers and a balance for change of 300 yen of three one hundred yen coins (number ▽X, number XO, number OO) is stored.

Numeral 23f is for service points given for purchase amounts etc. every time goods are purchased at a shop etc., with these service points being set by the issuing body.

Numeral 23g represents an individual information memo. The individual information memo is data for, for example, a driver's license or passport number, company employee certificate, residents card or public transport card.

Of the above data, at least the balance 23d, currency number 23e, point 23f and individual information memo 23g are stored on EEPROM.

(System Organization)

Next, a description is given of the system organization of the electronic transaction system of the present invention.

Figure 8:
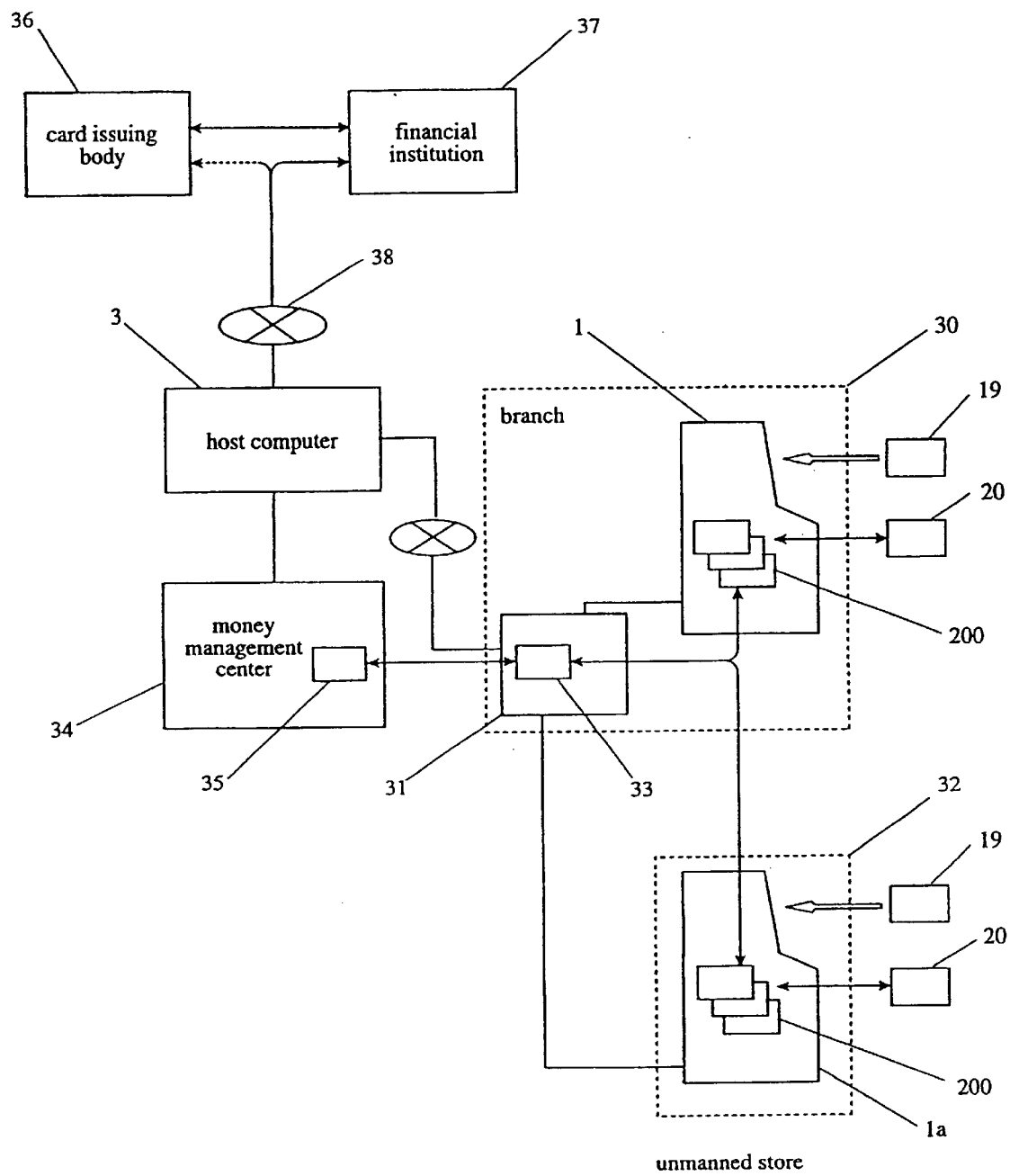
FIG. 8 is a system view of the electronic transaction system of the present invention.

FIG. 8 is a view of the system organization of the electronic transaction system of the present invention.

Numeral 30 represents a branch of a financial institution, with an ATM 1 established within a store. Numeral 31 is a branch cash server for controlling other ATMs (not shown) and an ATM 1a within an unmanned shop 32 and for sending funds from a server card 33 when there are insufficient funds at an ATM card 200 installed in the ATMs 1 and 1a.

Numeral 34 is a money management center for allotting separate funds to each branch and carrying out detailed audits of funds. The money management center also designates the transfer of funds from a center card 35 to a server card 33 within a branch 30.

Numeral 36 represents a credit company connected to a host computer 3 via a settlement network line 38. Numeral 37 represents a financial institution such as a bank etc. configured so as to be capable of carrying out transactions, with electronic settlement using an IC card also being possible.

(Electronic Transaction Procedure)

Next, a description is given of an example of an electronic transaction procedure occurring in the electronic transaction system of the present invention. In the following description, items which are common to the magnetic card 19 and the IC card 20 are described for a customer card.

Figure 9:
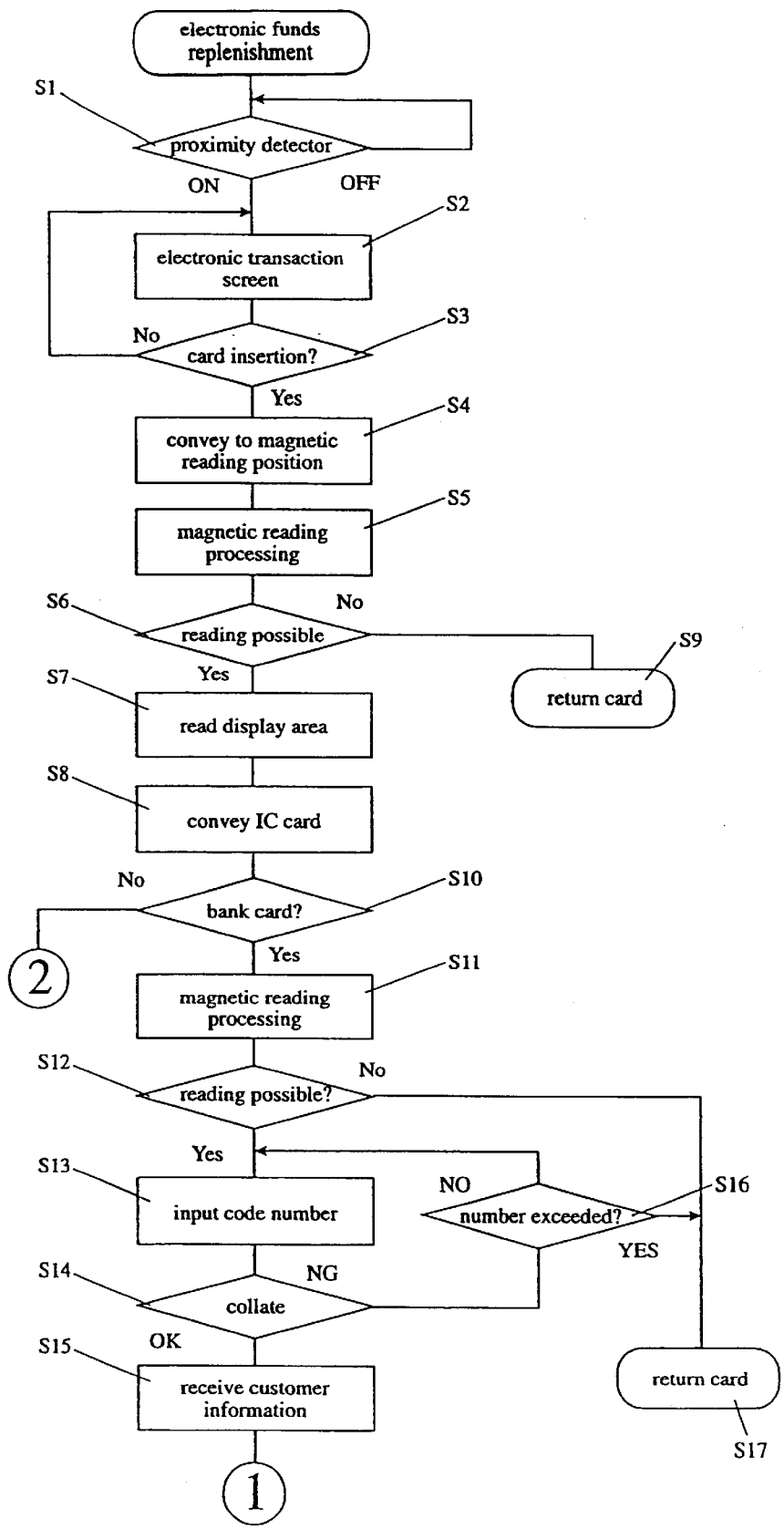
FIG. 9 is a flowchart of an electronic settlement of the present invention.
Figure 10:
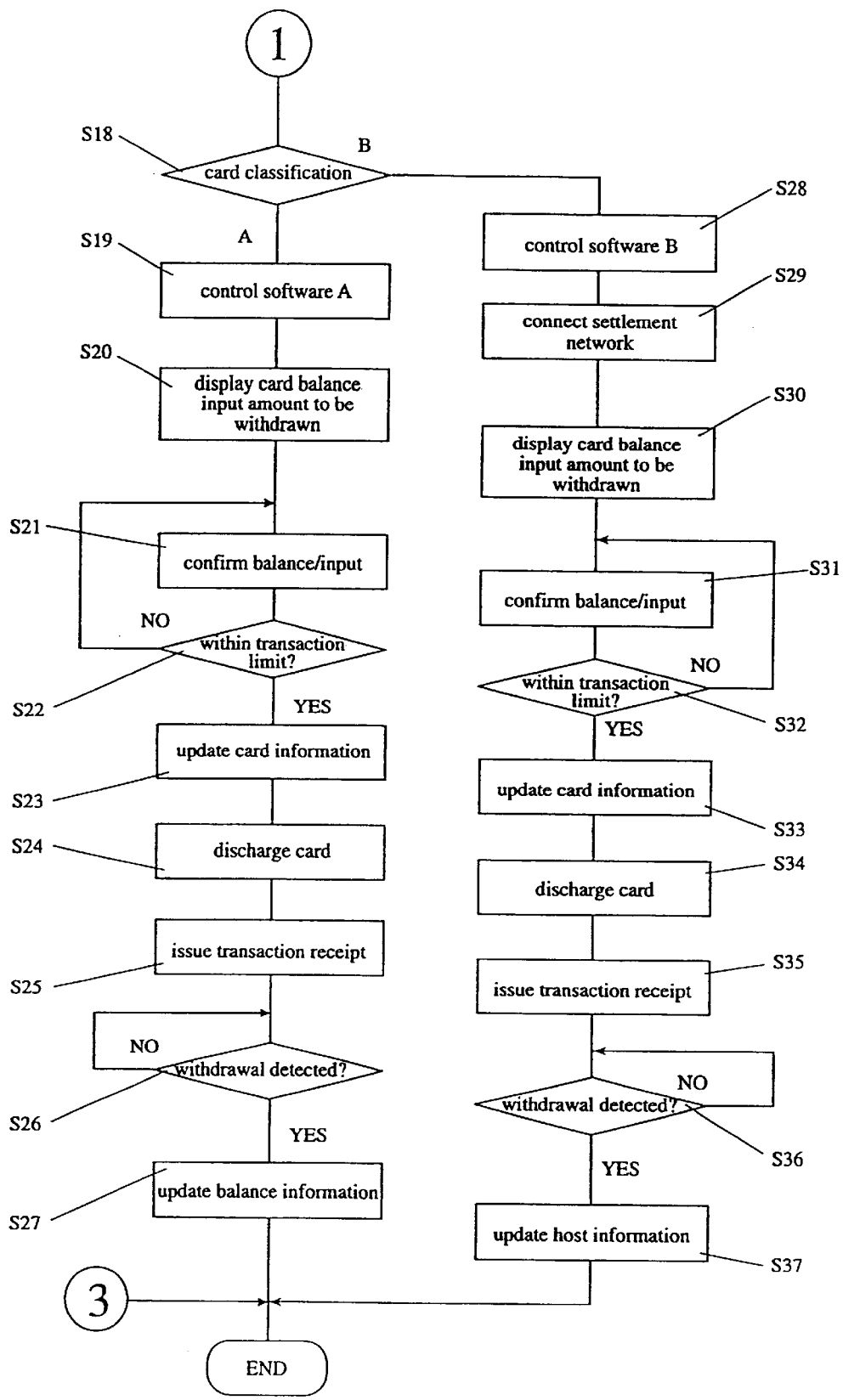
FIG. 10 is a flowchart of an electronic settlement of the present invention.
Figure 11:
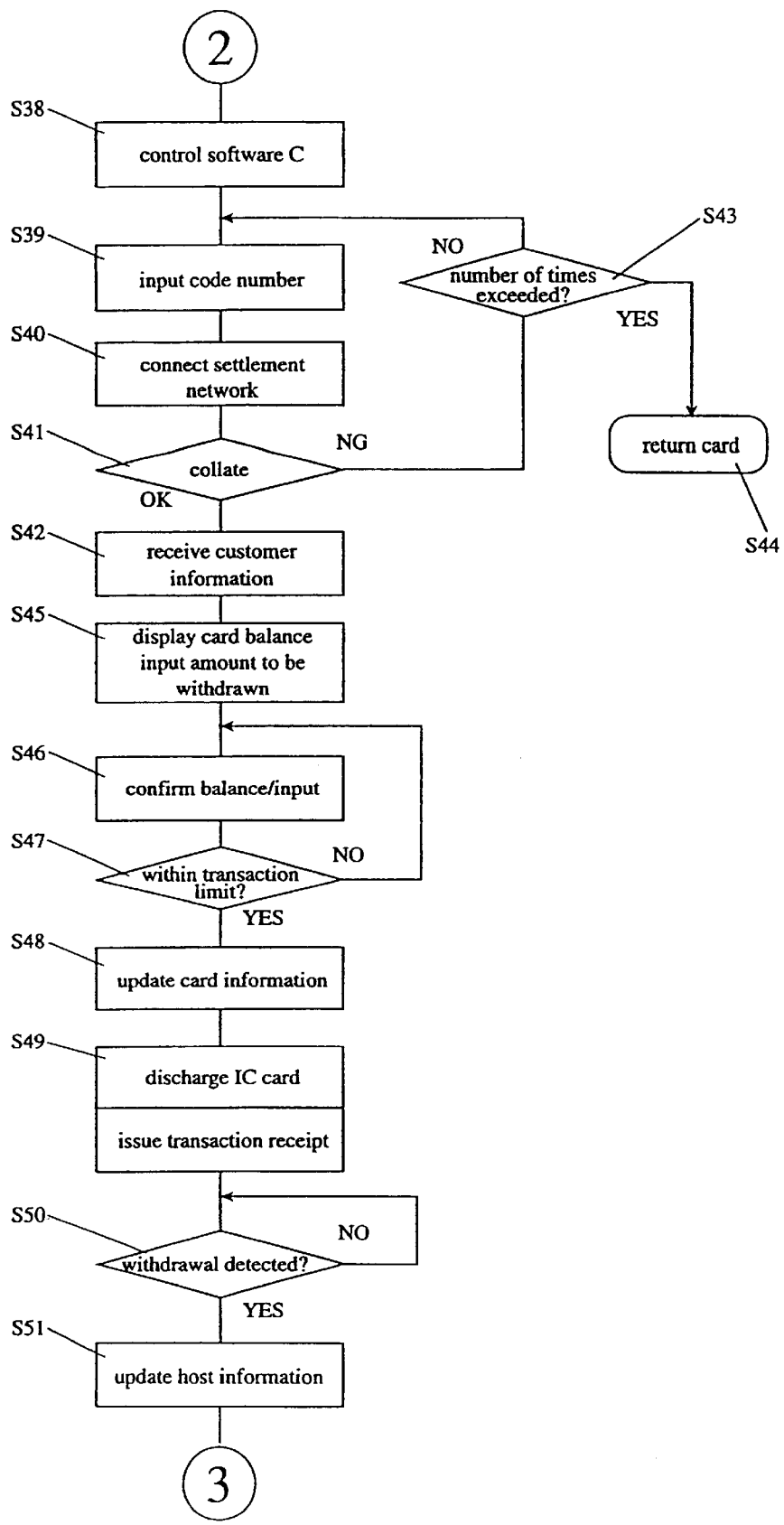
FIG. 11 is a flowchart of an electronic settlement of the present invention.
Figure 12:
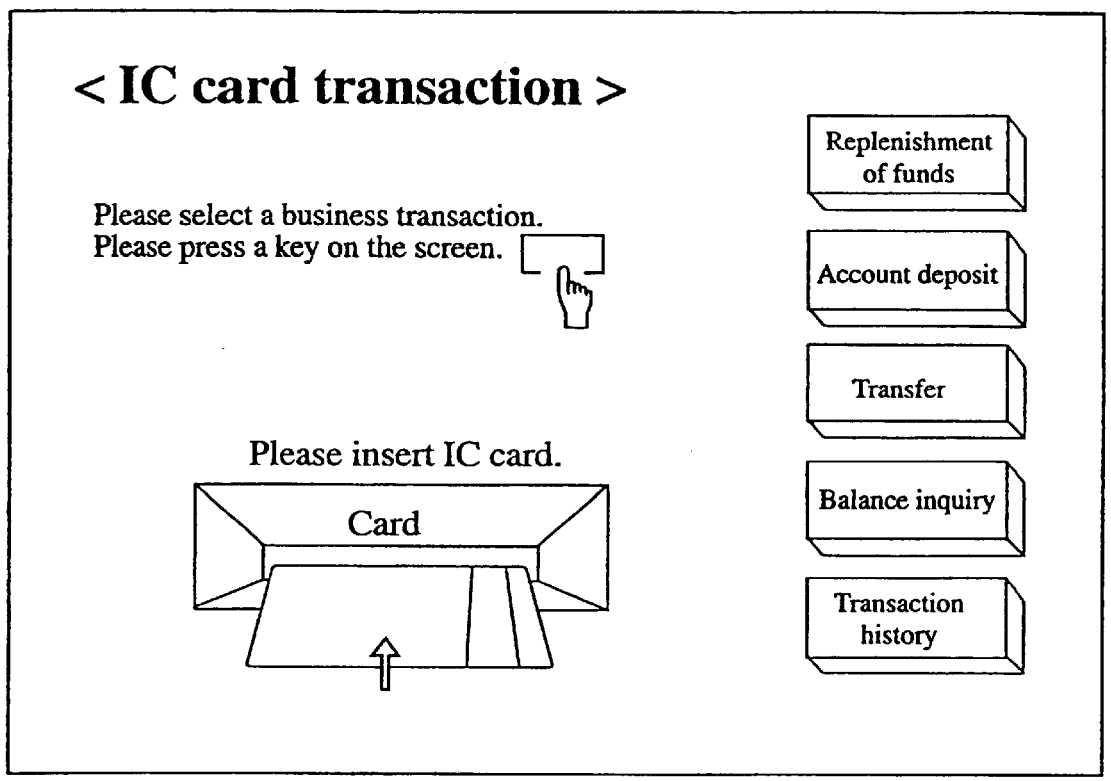
FIG. 12 is a view illustrating an example customer guidance screen display of the present invention.
Figure 13:
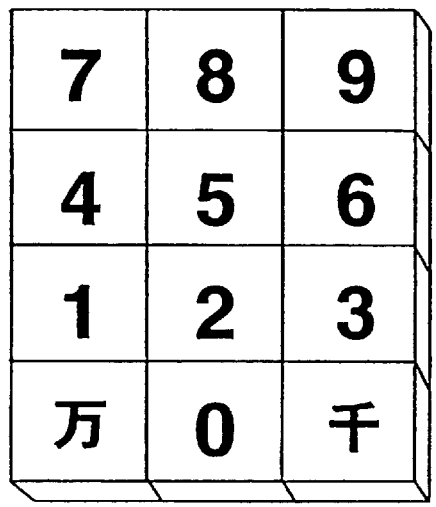
FIG. 13 is a view illustrating an example customer guidance screen display of the present invention.

FIG. 9, FIG. 10 and FIG. 11 are flowcharts showing the procedure for transferring funds from a customer deposit account to the IC card 20 as an example procedure for an electronic transaction. In these drawings a procedure is shown where a customer uses the magnetic card 19 and the IC card 20 so as to access a customer deposit account stored in the host computer of a financial institution using the magnetic card 19 so as to transfer funds from the customer deposit account to the IC card 20. Here, "S" indicates each operation step. Further, FIG. 12 is a view illustrating an example display of a customer guidance screen of the present invention and FIG. 13 is a further view illustrating an example display of a customer guidance screen of the present invention.

First, when a customer approaches the ATM, the ATM detects this using a proximity detector 16 and a display of a customer operating unit 9 is changed over from a wait screen to a customer guidance screen (S1). When the customer then presses "IC card transaction", the screen is changed over (S2), "please insert your IC card" is displayed as shown in FIG. 12 and a transaction selection is obtained.

When the customer presses "replenish funds" and inserts the customer card into a card insertion/return opening 5a, this is detected by the ATM 1 (S3) and this customer card is taken into the card processor 5 and transported as far as a magnetic reader 5b (S4). Magnetic information stored within the magnetic stripe 201 is then read (S5).

The ATM 1 then reads the magnetic information and discerns whether or not this is a card for which transactions are permitted (S6). At this time, the ATM 1 discerns whether the customer card is a magnetic card 19 or an IC card 20. Then ATM 1 then conveys the customer card further inside, reading of a display area 203 is carried out by the embossed character reader 5c (S7) and this information is temporarily stored in a storage part 14.

When the customer card is an IC card 20, the ATM 1 conveys the IC card 20 as far as a position from which information stored on the IC chip 202 is stored can be carried out and the IC card 20 is then temporarily halted (S8). When the customer card is a magnetic card 19, the ATM 1 is temporarily held in a temporary card holding section 6 and the customer is made to insert an IC card 20.

When the magnetic reading is not carried out in a normal manner in step S6, the ATM 1 conveys the card in as far as the card insertion/return opening 5a, indication that a transaction is not possible is displayed at the customer operating unit 9 and withdrawal of the customer card is indicated (S9).

After step S8, the ATM displays "input card of account to be withdrawn from and input code number, or when a card is not used, press the confirm button please" at the customer guidance screen, and the customer is invited to insert the magnetic card 19. When the magnetic card 19 is then inserted via the card insertion/return opening 5a, it is detected (S10) and carried as far as the card handling unit 5, and the magnetic information stored on the magnetic stripe 191 is read (S11). The case where a magnetic card 19 is not inserted and the confirmation button is pressed is described in the following.

When the ATM 1 determines that the bank card can be handled on the basis of the read magnetic information (S12), read information such as the account number etc. of the magnetic card 19 is transmitted to the host computer 3 and a search for customer information within a customer account file 4a within a storage device 4 is commenced. When a code number is then inputted by a customer (S13), the ATM 1 transmits this information to the host computer 3 and collation is carried out as to whether or not the code number coincides with a code number of code numbers pre-registered for every account number (S14).

When the collation results show that the code number exists, the host computer 3 sends the customer name and deposit balance information etc. back to the ATM 1 (S15).

When it is determined from the collation results that the code number is different, the host computer 3 gives notification to the ATM 1 that the code number is different. In this case, the ATM 1 displays "code number is incorrect, please input the code number again" so that the customer is urged to re-input the code number. If the collation is then carried out again so as to coincide, the next step is proceeded to. If it is determined that there is still no coincidence after re-collating, "the current code number is also incorrect, please press the cancel button and confirm the card" or "if incorrect again, transactions will not be possible" etc. are displayed. If a prescribed number of inputs is exceeded (S16), the magnetic card 19 is discharged at the card insertion/return opening 5a (S17).

After step S15, when the ATM 1 determines that transactions are possible from collation of the code number, the IC card type is discerned from the magnetic information read in step 5 (S18).

At this time, when the type of the IC card is determined to be type A, (in the following description, the IC card is taken to be 20a), the main controller 17 of the ATM 1 applies a voltage/clock in a prescribed order to a terminal part of the IC chip 202 of the IC card 20a suspended in step S8, and reading of the storage contents of the IC card 20a is carried out. The main controller 17 then selects control software for use with the card reader/writer 12a based on the type information read from the IC card 20a (S19).

At the same time, the main controller 17 confirms whether or not the card is a card compatible with the system from the ID number of the IC card 20a and valid period data 21 included in the information read from the IC card 20a. The ATM 1 then displays the kind of customer guidance screen shown in FIG. 13 at the customer operating unit 9. The customer then inputs the required amount from the numeric key pad in accordance with this display (S20).

The main controller 17 of the ATM 1 then confirms whether transaction processing is possible from the deposit balance information and inputted amount (S21). If possible, a determination is made as to whether or not this amount is within the transaction limit even when the amount to be withdrawn is added to the balance information of the IC card 20a (S22).

When the transaction limit is exceeded, the ATM 1 displays the maximum amount that can be withdrawn and a request is made to the customer for a revised input and a confirmation operation.

When the transaction limit is not exceeded, the ATM 1 sends a signal designating the transaction processing to the ATM card 200a installed at the IC card 20a and the first card reader 12a. The IC card 20a and the ATM card 200a that receive this signal then make their own determinations as to whether the conditions are fulfilled for carrying out fund transfers. When the IC card 20a and the ATM card 200a determine that the conditions are fulfilled, a signal designating fund transferring is sent to the other cards, with fund transfers then being carried out when the signal designating fund transferring is received (S23).

At this time, the IC card 20a adds the entered amount to the electronic money balance stored within itself and the ATM card 200a subtracts the outputted amount from the electronic money balance stored within itself and also calculates a new balance. The IC card 20a and the ATM card 200a send the balances calculated by themselves to the other cards and it is reciprocally confirmed whether or not these calculations are correct.

When the calculations are correct, both cards send a signal to the other card consenting to transaction processing. In this way, both cards update storage regions for storing the balances with new balances and transaction processing is carried out. When a calculation is not correct, one of the cards sends a signal to the other card indicating that consent is not given to transaction processing and the other card is made to carry out the calculations again. If the calculations are correct on this occasion, both cards carry out transaction processing. If the calculations are not correct, an alarm signal is transmitted to the ATM 1 and transaction processing is suspended.

In parallel with the operation of step S23, the main controller 17 of the ATM 1 designates issuance of a receipt 8 at the receipt handling unit 7. As a result of this, the receipt handling unit 7 prints the contents of the transaction processing and the read information of the display area stored at the storage part 14 on the receipt 8 and the receipt 8 is conveyed to the vicinity of the card insertion/return opening 5a.

The ATM 1 then discharges the magnetic card 19 from the card insertion/return opening 5a(S24). When the ATM detects withdrawal of the magnetic card 19 by the customer using a detection means (not shown), the receipt 8 and the IC card 20a are simultaneously discharged from the card insertion/return opening 5a (S25). The ATM 1 then detects withdrawal of the receipt 8 and the IC card 20 by the customer using the detecting means (not shown) (S26). Processing for paying to the customer is then complete.

Finally,the host computer 3 updates the customer deposit balance information stored in the customer account file 4a (S27) so that all of the processing is complete.

Next, a description is given of where card type B is identified in step S18 as the IC card type (in the following description IC card 20b is assumed). The IC card 20b is a card of different settlement conditions from the IC card 20a (for example, electronic money using different methods or electronic money of different issuing bodies or cards carrying out transaction processing in different ways even though the issuing body is the same).

After step S18, the main controller 17 of the ATM 1 applies a prescribed voltage/clock in a prescribed order to the terminal part of the IC chip 202 of the IC card 20b which was halted in step S8 and the storage contents of the IC card 20b are read.

The main controller 17 then selects the control software 14b for use with the card reader/writer 12b based on the type information read from the IC card 20b (S28). At the same time, the main controller 17 confirms whether or not the card is appropriate for the system from the ID number of the IC card 20b and valid period data 22d etc. included in the information read from the IC card 20b. A connection is then made with the card issuing body 36 via the settlement network line 38 (S29) and the information read from the IC card 20b is transmitted. The card issuing body 36 then confirms whether or not the card is compatible with the system, with information indicating card compatibility being sent back to the ATM 1 when card compatibility is confirmed.

When the kind of customer guidance screen shown in FIG. 13 is then displayed at the customer operating unit 9, the customer inputs the required amount using the numeric key display (S30).

The main controller 17 of the ATM 1 then confirms whether or not a transaction is possible from the deposit balance information received in step S15 and the inputted amount (S31). If possible, a determination is made as to whether or not the transaction is within the transaction limit even if the amount to be withdrawn is subtracted from the balance information provided for the IC card 24b (S32).

If this transaction exceeds the transaction limit, the maximum amount that can be withdrawn is displayed by the ATM 1 and the customer is requested to provide a revised input and a confirmation operation.

When the transaction limit is not exceeded, the ATM 1 sends a signal designating the transaction processing to the ATM card 200b installed at the IC card 20b and the second card reader 12b. The IC card 20b and the ATM card 200b that receive this signal then make their own determinations as to whether the conditions are fulfilled for carrying out fund transfers. When the IC card 20b and the ATM card 200b determine that the conditions are fulfilled, a signal designating fund transferring is sent to the other cards, with fund transfers then being carried out when the signal designating fund transferring is received (S33). At this time, an amount corresponding to the withdrawn amount is subtracted from the balance provided for the IC card 20b for updating and electronic money corresponding to the withdrawn amount is transferred from the ATM card 200b to the IC card 20b and stored in the storage region storing electronic money of the IC card 20b. Transferring of electronic money between the ATM card 200b and the IC card 200b is carried out in the same order as transferring of electronic money between the ATM card 200a and the IC card 20a.

In parallel with the operation of step S33, the main controller 17 of the ATM 1 designates issuance of a receipt 8 at the receipt handling unit 7. As a result of this, the receipt handling unit 7 prints the contents of the transaction processing and the read information of the display area stored at the storage part 14 on the receipt 8 and the receipt 8 is conveyed to the vicinity of the card insertion/return opening 5a.

The ATM 1 then discharges the magnetic card 19 from the card insertion/return opening 5a (S34). When the ATM 1 detects withdrawal of the magnetic card 19 by the customer using the detecting means (not shown), the receipt 8 and the IC card 20b are simultaneously discharged from the card insertion/return opening 5a (S35). The ATM 1 then detects withdrawal of the receipt 8 and the IC card 20 by the customer using the detecting means (not shown) (S36). The process for outputting money to the customer is then complete.

Finally, the host computer 3 updates the balance information for the credit limit of the customer stored in the customer account file 4a (S37) and all of the processing is then complete.

Next, a description is given of where card type C is identified in step S18 as the IC card type (in the following description IC card 20c is assumed). The IC card 20c is a card of different settlement conditions to the IC card 20a and the IC card 20b (for example, electronic money using different methods or electronic money of different issuing bodies or cards carrying out transaction processing in different ways even though the issuing body is the same) and is equipped with bank card functions.

When the confirmation button is pressed in step S10 without a magnetic card being inserted (in the following description the customer card is taken to be the IC card 20c), the main controller 17 of the ATM 1 applies a voltage/clock in a prescribed order to the terminal part of the IC chip 202 of the IC card 20c suspended in step S8 and reading of the storage contents of the IC card 20c is carried out.

The main controller 17 then selects the control software 14c for use with the card reader/writer 12c based on the type information read from the IC card 20c (S38). At the same time, the main controller 17 confirms whether or not the card is appropriate for the system from the issuing body code and ID number etc. of the IC card 20c included in the information read from the IC card 20c. The ATM 1 then displays the message "Please input your code number" and the customer is invited to input his code number (S39).

At the same time, the ATM 1 makes a line connection with the card issuing body 36 via the settlement network line 38 (S40) and information read from the IC card 20c is transmitted. The card issuing body 36 then searches for customer information corresponding to the IC card 20c. When the code number is inputted by the customer, the ATM 1 also sends this information to the card issuing body 36. The card issuing body 36 then carries out collation to determine whether or not the code number corresponds with a code number pre-registered for each account number (S41). When corresponding customer information exists, the card issuing body 36 sends the customer name and deposit balance information etc. back to the ATM 1 (S42).

If it is determined from the collation results of step S41 that the code number is different, the ATM 1 displays the message "code number incorrect, please input again" and the customer is invited to re-input the code number. If collation is then carried out again and the numbers match the next step is proceeded to.

When it is determined that there is still no coincidence after collating again, the ATM 1 displays the messages "the current code number is also incorrect, please press the cancel button and confirm the card" or "if there is a further mistake, a transaction will not be possible". If a prescribed number of inputs is exceeded (S43), the ATM 1 discharges the IC card 20c at the card insertion/return opening 5a (S44).

When the ATM 1 displays a customer guidance screen at the customer operating unit 9, the customer inputs the required amount from the numeric key pad display (S45). The main controller 17 of the ATM 1 then confirms whether or not a transaction is possible from the received deposit balance and the inputted amount (S46). If possible, a determination is made as to whether or not adding the amount to be withdrawn to the balance of the IC card 20c exceeds the transaction limit (S47). If this is within the transaction limit, the ATM 1 updates the balance information for the IC card 20c (S48).

The ATM 1 then subtracts the amount withdrawn from the currency balance taken as electronic money stored in the ATM card 200c installed in the third card reader/writer 12c and updates the balance information. When the transaction limit is exceeded in step S42, the ATM 1 displays the maximum amount that can be withdrawn and asks the customer to make a revised input and confirmation operation.

In parallel with the operation of step S48, the main controller 17 of the ATM 1 designates issuance of a receipt 8 at the receipt handling unit 7. As a result of this, the receipt handling unit 7 prints the contents of the transaction processing and the read information of the display area stored at the storage part 14 on the receipt 8 and the receipt 8 is conveyed to the vicinity of the card insertion/return opening 5a.

The ATM 1 then discharges the receipt 8 and the IC card 20c simultaneously from the card insertion/return opening 5a (S49) and detects withdrawal of the receipt 8 and the IC card 20c by the customer using the detection means (not shown) (S50). Processing for outputting money to the customer is then complete.

Finally, information for the amount of money withdrawn (designation of transfer of currency information) from the IC card 20c is transmitted to the financial institution 37 such as a bank etc. The deposit balance for the customer within the customer account file 4a managed by the financial institution 37 is then updated (S51) and the electronic money settlement processing is complete.

In the above a description is given for the case where the charge settlement type code set at the IC card 20 is stored in the magnetic stripe 201 and charge settlement of a type corresponding with the charge settlement set at the IC card 20 is carried out using the magnetic information read from the magnetic stripe 201 without using the information stored within the IC chip 202 of the IC card 20.

Next, a description is given of the case where the ATM 1 settles charges using information stored in the IC chip 202 of the IC card 20 without the charge settlement type code set at the IC card 20 being stored at the magnetic stripe 201.

Figure 14:
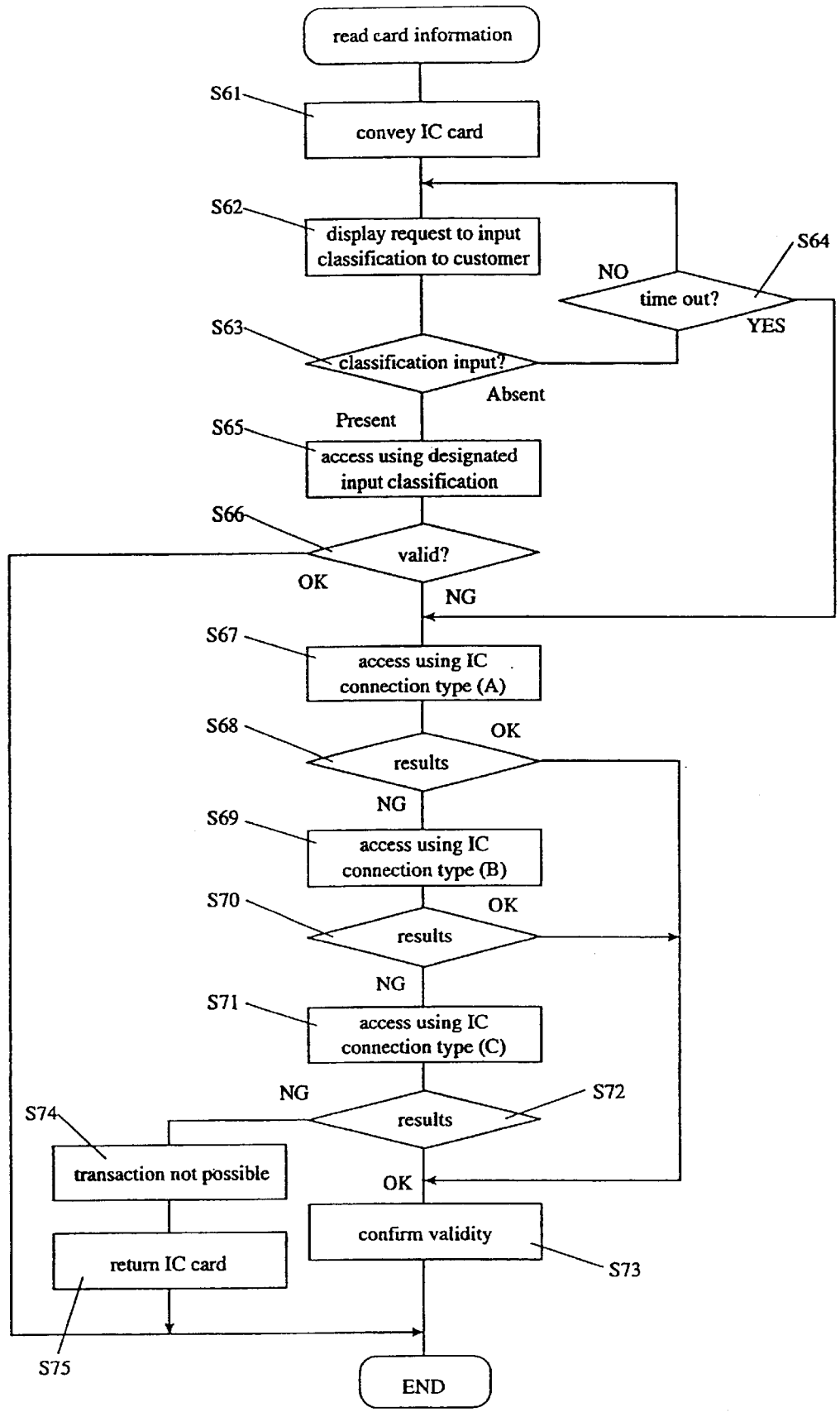
FIG. 14 is a flowchart of the electronic settlement of the present invention.

The charge settlement type set at the IC card 20 is inputted by the customer into the ATM 1 via the customer operation unit 9. When the customer has not inputted the type (card type designation) within a prescribed time, the ATM 1 tries out a plurality of types of charge settlement set at itself in a prescribed order of, for examples type code A, type code B and type code C. FIG. 14 is a flowchart showing this operation of the ATM 1.

When the IC card 20 is inserted, the ATM 1 reads the magnetic information stored in the magnetic stripe 201. When there is no type code data within the magnetic information read in, the ATM 1 determines that confirmation of the type is not possible and conveys the IC card 20 to the IC card reader/writer 5d (S61). The ATM 1 then displays the message "please designate the transaction institution for this IC card" and the name of the machine for which permitted transactions are possible is displayed (S62). A timer monitoring the presence of an input in accordance with this display is then made to operate and a customer input is awaited (S63).

If there is still no input after a prescribed time (of, for example, 5 seconds) has passed, then the ATM proceeds to step S67 (S64), and time out processing is executed.

When there is no input within a prescribed time period, the ATM 1 selects control software 14n corresponding to the inputted type N, activates the IC card reader/writer 12n and activates the ATM card 200n installed at the IC card reader/writer 12n. At this time, the ATM card 200n accesses the IC card 200 (S65) and confirms whether or not the IC card 20 is appropriate (S66). When the compatibility of the IC card 20 is confirmed, the ATM card 20n carries out settlement transactions and access ends when the settlement transaction is complete.

When compatibility of the IC card 20 cannot be confirmed using the control software 14n corresponding to the type code N, the ATM code 200n transmits a signal to the ATM 1 indicating that the card is not appropriate. In doing so, the ATM 1 selects control software 14a corresponding to the type code A, drives the IC card reader/writer 12a and activates the ATM card 200a installed at the IC card reader/writer 12a. At this time, the ATM card 200a transmits a prescribed signal to the IC card 20, accesses the IC card 20 (S67) and confirms whether or not the IC card 20 has sent back an appropriate response with respect to this signal (S68). At this time, step 73 is then proceeded to if the IC card 20 sends back an appropriate response at this time.

When compatibility of the IC card 20 cannot be confirmed using the control software 14n corresponding to the type code N, the ATM code 200n transmits a signal to the ATM 1 indicating that the card is not appropriate. In doing so, the ATM 1 selects control software 14a corresponding to the type code A, drives the IC card reader/writer 12a and activates the ATM card 200a installed at the IC card reader/writer 12a. At this time, the ATM card 200a transmits a prescribed signal to the IC card 20, accesses the IC card 20 (S67) and confirms whether or not the IC card 20 has sent back an appropriate response with respect to this signal (S68). At this time, step 73 is then proceeded to if the IC card 20 sends back an appropriate response at this time.

When the IC card 20 does not send back an appropriate response in step 68, the ATM card 200a transmits a signal to the ATM 1 indicating that the IC card 20 is not a type code A card. The ATM 1 then selects control software 14b corresponding to the type code B, drives the IC card reader/writer 12b, and activates the ATM card 200b installed at the IC card reader/writer 12b. At this time, the ATM card 200b transmits a prescribed signal to the IC card 20 and accesses the IC card 20 (S69) and confirms whether or not the IC card 20 sends back an appropriate response with respect to this signal (S70). At this time, step S73 is proceeded to if the IC card 20 sends back an appropriate response at this time.

When the IC card 20 does not send back an appropriate response in step S70, the ATM card 200b transmits a signal to the ATM 1 indicating that the IC card 20 is not a type code B card. The ATM 1 then selects control software 14c corresponding to the type code C, drives the IC card reader/writer 12c, and activates the ATM card 200c installed at the IC card reader/writer 12c. At this time, the ATM card 200c transmits a prescribed signal to the IC card 20, accesses the IC card 20 (S71) and confirms whether or not the IC card 20 sends back an appropriate response with respect to this signal (S72). Step S73 is then proceeded to if the IC card 20 sends back an appropriate response.

When the IC card 20 does not sent back an appropriate response in step S72, the ATM card 200c transmits a signal to the ATM 1 indicating that the IC card 20 is not a card of type code C. The ATM 1 then displays that transactions are not possible at the customer operation unit 9 (S74), the IC card 20 is discharged from the card insertion/return opening 5a (S75) and the process is complete.

When the IC card 20 sends back an appropriate response in step S68, step S70 or step S72, the ATM card 200 confirms whether or not the IC card 20 is an appropriate card (S73). When the ATM card 200 confirms that the IC card 20 is appropriate, charge settling is carried out and the processing ends when the charge settlement is complete.

Various modifications of the above embodiment are possible.

For example, the order of activation of the control software 14 can be set up based on the market share of the transaction conditions. The likelihood of the type of cash settlement set at the IC card 20 and the control software 14 matching is therefore increased and processing can therefore be carried out in a shorter time period.

Further, the ATM 1 can be capable of carrying out processing for more than three types of charge settlement. This kind of ATM 1 can be realized by, for example, making the number of built-in card reader/writers greater than three. This kind of ATM 1 can also be realized by making the configuration of the ATM card 200 installed in the card reader/writer 12 such that a plurality of charge settlement types can be carried out with a single card. Specifically, the ATM card 200 is configured to store data such as that shown in FIG. 5, FIG. 6 and FIG. 7 in response to the types of charge settlement for which processing is possible. The ATM card 200 then receives the type code and issuing body code etc. from the customer card at the time of a goods transaction, decides the charge settlement type in response to this data and charge settlement is then executed. This kind of ATM 1 is capable of a large number of types of transaction settlement using a single machine and a system in which a plurality of card issuing bodies can work in cooperation can therefore be provided.

Control software can be automatically activated on the device side and accessing can be carried out without the customer inputting the settlement type, which is extremely convenient for inexperienced customers.

EFFECTS OF THE INVENTION

The present invention described above has the following effects.

A customer can make transactions using an automatic teller machine of a nearby financial institution even when a plurality of settlement conditions exist for transactions using electronic money. It is therefore no longer necessary for the customer to look for a branch of the financial institution that issued the card or to go to branches far away, thus increasing convenience for the customer.

By refitting just part of an automatic teller machine maintained at great investment in equipment by a financial institution, a plurality of IC card reader/writers can be stored if, for example, the space for one related money storage box is guaranteed. Further, as IC cards are extremely safe from a security point of view, a plurality of card reader/writers can be added by attachment to the rear side of the ATM and compatibility can therefore easily be achieved.

What is claimed is:

1. An electronic transaction system comprising:
    a first IC card of a customer for storing information specifying a type of electronic money and electronic money issued by a money issuer;
    a terminal capable of having the first IC card inserted into it; and
    a plurality of second IC cards of the terminal for storing electronic money provided at the terminal, each of the plurality of second IC cards storing a different type of electronic money issued by different money issuers or by the same money issuer,
    wherein the terminal reads out information specifying a type of electronic money stored in the first IC card when the first IC card is inserted into the terminal and selects one of the plurality of second IC cards storing the type of electronic money specified by the information read from the first IC card, and the type of electronic money specified by the information is transferred between the first IC card and the one of the plurality of second IC cards selected by the terminal.

2. The electronic transaction system of claim 1, wherein the terminal makes each of the plurality of second IC cards start sending the prescribed signal to the first IC card by a preset order when information specifying the type of the electronic money cannot be read from the first IC card, and makes the one of the plurality of second IC cards carry out at least one transaction with the first IC card when the first IC card returns an appropriate response to the terminal.

3. The electronic transaction system of claim 1, wherein information specifying the electronic money type is set for each money issuer or for each type of electronic money when the money issuer is the same.

4. The electronic transaction system of claim 1, wherein the terminal is an automatic teller machine.

5. The electronic transaction system of claim 2, wherein information specifying the electronic money type is set for each money issuer or for each type of electronic money when the money issuer is the same.

6. The electronic transaction system of claim 2, wherein the terminal is an automatic teller machine.

7. The electronic transaction system of claim 3 wherein the terminal is an automatic teller machine.

8. The electronic transaction system according to claim 1, wherein said information specifying the type of electronic money includes information showing a settlement condition of electronic money.

9. The electronic transaction system according to claim 8, wherein the terminal comprises:
    memory in which is stored at least two different types of control software corresponding to at least two different types of settlement conditions of electronic money that may be stored on said first IC card, wherein the terminal uses the type of control software corresponding to the type of settlement condition of electronic money shown by the information specifying the type of electronic money.

10. The electronic transaction system according to claim 1, the terminal including:

a controller, said controller selecting one of the second IC cards storing the type of electronic money specified by the information read from the first IC cards.

11. The electronic transaction system according to claim 1, wherein at least one of said plurality of second IC cards stores different types of electronic money.

12. A method of performing electronic transactions using an electronic transaction system that includes a user IC card, a terminal, and a plurality of system IC cards, the user IC card storing information specifying a type of electronic money and storing electronic money issued by a money issuer, wherein the terminal is arranged so as to permit insertion of a user IC card into it, and wherein each of the plurality of system IC cards stores a different type of electronic money issued by the same money issuer or by different money issuers, the method comprising the steps of:

receiving a user IC card in said terminal;

reading out information from the user IC card, said information specifying a type of electronic money stored in the first IC card;

selecting one of said plurality of system IC cards storing the type of electronic money specified by the information read from the user IC card; and transferring electronic money between the user IC card and the selected system IC card.

13. The method according to claim 12, further comprising the step of:

if information specifying a type of electronic money can not be read from the inserted user IC card, sending, in a preset order, prescribed signals from each of the plurality of system IC cards to the user IC card; and when, in response to the prescribed signals from one of the plurality of system IC cards, the user IC card returns an appropriate response to the terminal, causing at least one transaction to be performed between the user IC card and that one of the plurality of system IC cards.

14. The method according to claim 12, wherein at least one of said system IC cards stores at least two different types of electronic money.

15. The method according to claim 12, wherein the information specifying the type of electronic money includes information showing a settlement condition of electronic money.

16. The method according to claim 12, further comprising the step of: establishing a connection through a settlement network to a financial institution or other card issuer for confirmation purposes.

17. The method according to claim 12, further comprising the step of:

selecting control software corresponding to the information read from the user IC card.

* * * * *